Figure 2:
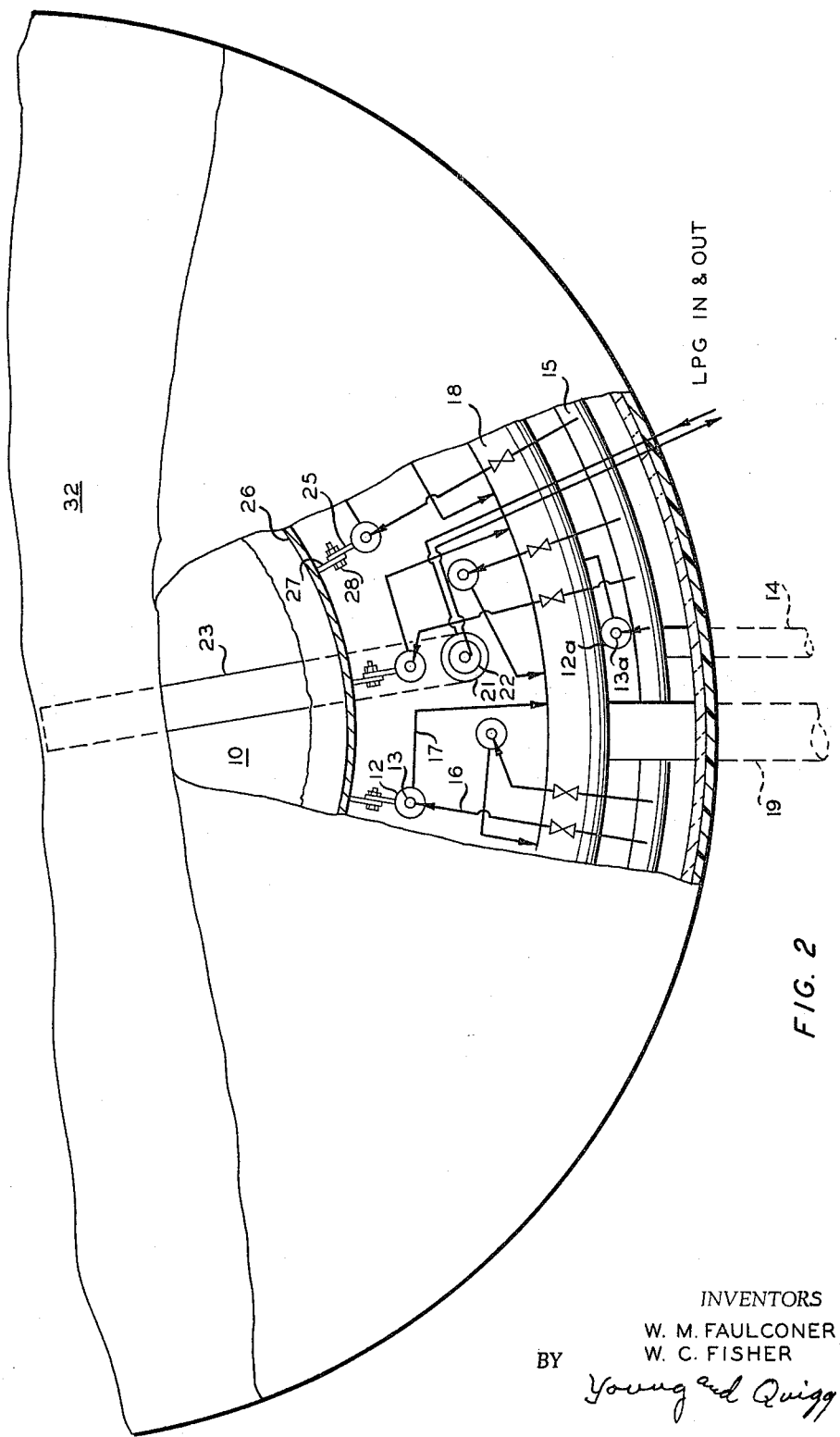

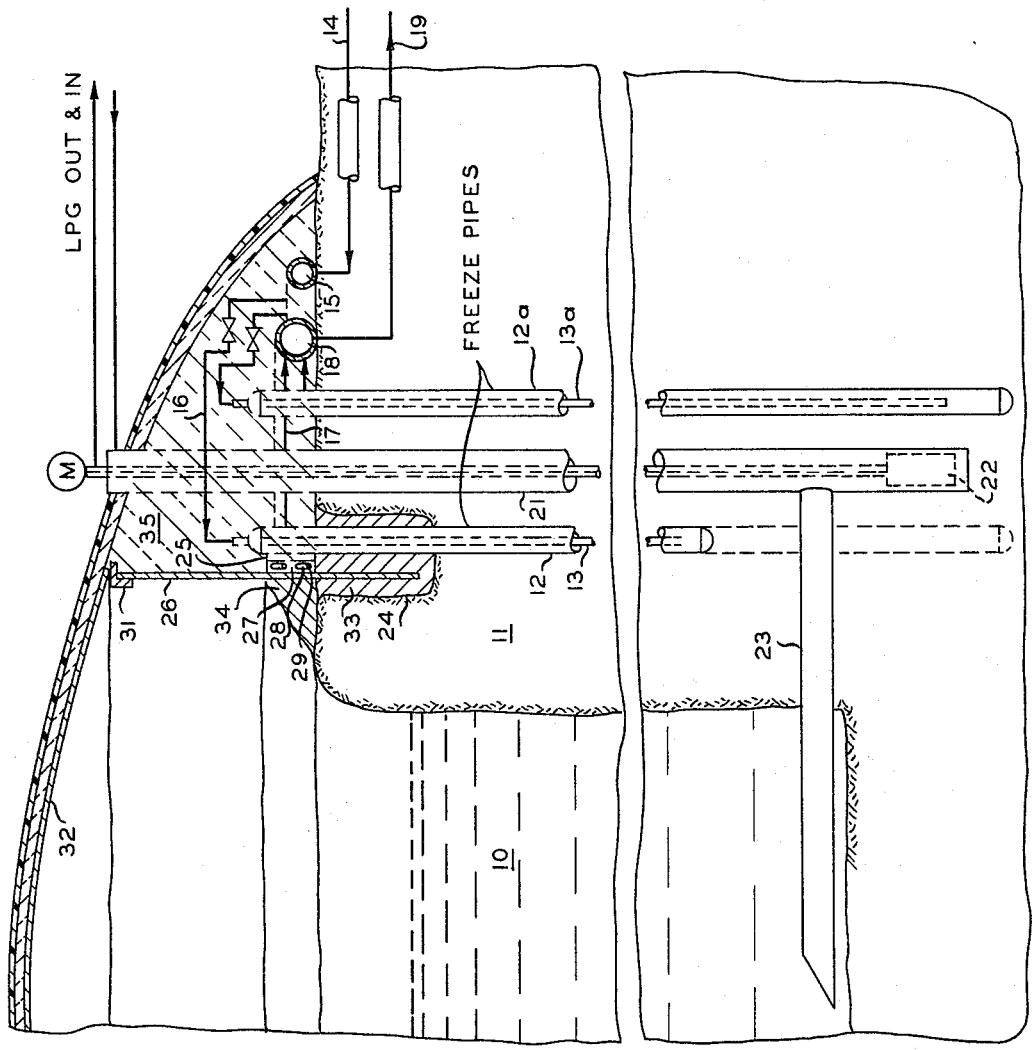
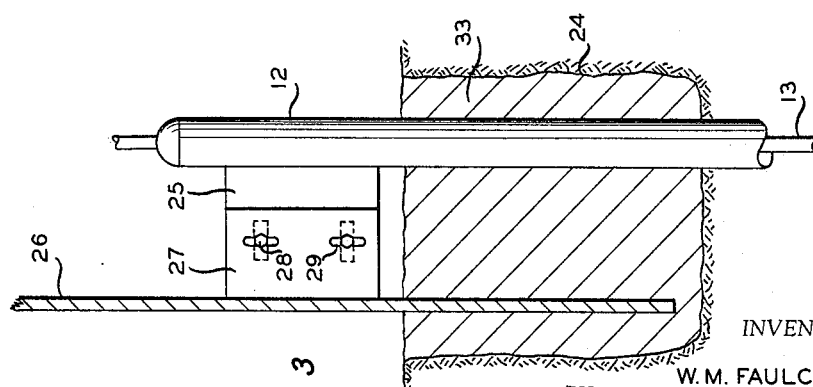

United States Patent Office 3,287,914
Patented Nov. 29, 1966

3,287,914
EARTHEN STORAGE FOR VOLATILE LIQUIDS AND METHOD OF CONSTRUCTING SAME
William M. Faulconer, and William C. Fisher, Bartlesville, Okla., assignors to Phillips Petroleum Company, a corporation of Delaware
Filed Aug. 19, 1963, Ser. No. 302,830
5 Claims. (Cl. 61—.5)

This invention relates to the storage of volatile liquids. In one aspect it relates to a method for preparing a reservoir in the surface of the earth for the storage of volatile liquids. In another aspect it relates to an open-topped earthen reservoir in frozen earth having a vapor-impermeable cover thereover.

The petroleum industry produces great quantities of volatile liquid hydrocarbons as a result of processing crude oil and natural gas. Volatile liquids such as propane and butane require enormous storage facilities during periods of slack use. Increased seasonal demand for such products places an increased strain on these facilities. Great quantities of volatile liquids including propane and butane have been stored in underground caverns mined or dissolved from impervious formations. Such reservoirs, however, are limited to certain formations which are not always available at the desired location; are expensive to prepare; and present a serious problem of providing adequate vapor seals. More recently it has been proposed to fill an open-topped earthen reservoir with water, refrigerate the reservoir so as to freeze an ice cap on the water, pump out the water and fill the reservoir with a volatile liquid. Such reservoir is disclosed and claimed in Patent No. 2,961,840, issued November 29, 1960, to W. A. Goldtrap. Still more recently it has been proposed to form an open-topped earthen reservoir in frozen earth and to cover the reservoir with a vapor-impermeable roof which is supported by and sealed to the frozen earth around the periphery of the reservoir.

The principal problem encountered in a frozen earth storage system is that of providing and maintaining an adequate vapor seal between the earthen reservoir and the cover or roof for the reservoir. Movement of the earthen formations as a result of the extreme temperature differences involved in a frozen earth storage and manifested by heaving of the formation adjacent the reservoir aggravates the problem of effecting and maintaining a vapor-tight cover over an open-topped frozen earth storage reservoir.

According to our invention the roof of a frozen earth storage reservoir is attached at its perimeter to a vertical shell or wall which is further attached by gussets or flanges to vertical freeze pipes sunk into the ground around the periphery of the reservoir. The shell extends downward into the frozen earth to make a vapor seal and the ground area on both sides of the shell is covered by a thick layer of frozen earth. The bank of frozen earth outside the shell is covered with an insulated layer which can be an extension of the insulation for the roof of the reservoir.

It is an object of this invention to provide a method for establishing and maintaining a vapor-tight seal between the frozen earth of an earthen reservoir and the roof of the reservoir. It is also an object of the invention to provide a vapor-tight seal between the frozen earth of an earthen reservoir and the roof of the reservoir which is not affected by movement of the frozen earth surface. A further object of the invention is to provide a support for the roof of a frozen earth reservoir which is a load-bearing support in both vertical directions. Still another object of the invention is to provide a support for the roof of a frozen earth storage which is not affected by movement of the earthen formations around the periphery of a frozen earth storage reservoir. Other objects and advantages of the invention will be apparent to one skilled in the art upon studying the disclosure of the invention including the detailed description and the appended drawing wherein:

FIGURE 1 is a view, in cross section, of a portion of the wall and roof of an earthen reservoir embodying the present invention;
FIGURE 2 is a plan view of a segment of the reservoir of FIGURE 1 with a portion of the roof removed; and
FIGURE 3 is a detail of the wall of FIGURE 1.

In FIGURE 1, a reservoir 10 is excavated in frozen earth 11. The earth 11 is frozen by means of a plurality of freeze pipes 12 sunk into the ground around the site of the reservoir 10. Each freeze pipe comprises a conduit 12 containing a refrigerant inlet pipe 13. A refrigerant is supplied to the inlet pipe 13 via conduit 14, manifold 15 and conduit 16 from a refrigeration system (not shown). The refrigeration system can be a conventional compressor and condenser combination. Several rows of freeze pipes can be utilized, as desired, as indicated at 12a and 13a. Refrigerant vapors are removed from conduit 12 via conduit 17, manifold 18 and conduit 19 and returned to the refrigeration system. The manifolds and conduits leading to and from the freeze pipes are suitably insulated.

A pump jacket conduit 21 is also sunk into the earth to accommodate a submerged discharge pump 22. A pump suction conduit 23 connects the pump jacket 21 to the reservoir 10. The pump jacket serves as an extra freeze pipe during the initial freezing of the earthen formation. The pump jacket can also serve as a fill line for adding volatile liquid to the reservoir 10 since the pump 22 is below the level of the pump suction conduit 23.

A trench 24 is formed in the earth around the periphery of the reservoir 10 so that at least a portion of the trench is between the row of freeze pipes 12 and the reservoir 10. A flange or gusset 25 is welded to each of the freeze pipes 12 on the reservoir side of the freeze pipe above the ground level. A weldable metal wall 26 is positioned in the trench 24 so that flanges 27, welded to the wall 26, overlap flanges 25 in sliding relationship. Bolts 28 in slots 29 of the flanges provide sliding adjustment between the wall 26 and the freeze pipes 12. This is better shown in FIGURE 3.

A right angle member 31 is welded or otherwise secured to the top of wall 26 to provide a seating means for roof 32. The roof 32 is secured to the angle member 31, for example by welding. The junctions between the wall 26 and angle member 31 and between angle member 31 and roof 32 are made vapor-impermeable and load-bearing vertically in both directions.

The trench 24 is filled with water or a slurry of water and earth and frozen as indicated at 33. The area between the wall 26 and the reservoir 10 is banked with mud as shown at 34 and the area outside the wall 26 is banked with mud to a point beyond the freeze pipes as shown at 35. The roof 32 and the mud bank 35 are covered wiht a layer of weather-proof insulation.

The invention will now be described as applied to a circular earthen reservoir 95 feet in diameter and 95 feet in depth. A first 111-foot diameter circle and a second 117-foot diameter circle of freeze pipes are sunk 150 feet into the ground around the reservoir site. The freeze pipe casings 12 and 12a are 4-inch diameter conduits and the liquid refrigerant inlet pipes 13 and 13a are 1-inch diameter conduits. A 10-inch diameter conduit is sunk between the rows of freeze pipes to serve as the discharge pump jacket and fill line upon completion of the reservoir and is utilized as an additional freeze pipe during the initial freezing operation. Liquid refrigerant (propane) is supplied to the lower end of the freeze pipes via the inlet pipes. The ring wall or shell 26 is 6 feet in height, of one-quarter inch tank steel plate and is sunk 4 feet into the ground on the inside of the circle of freeze pipes by digging a trench around the periphery of the reservoir site and filling the trench after placement of the wall with mud. A flange or gusset is welded to each of the freeze pipe conduits 12 on the side adjacent the shell 26 and a similar flange is welded to the wall 26 so as to overlap, in sliding contact, the flange welded to the freeze pipe. The flanges are then bolted together through slots in the flanges which allow for adjustment during the positioning of the wall. Vertical slots in one flange and horizontal slots in the adjacent flange provide for both vertical and horizontal adjustment of the wall. Flange connections as described connect each of the freeze pipes 12 to the wall 26. Mud is banked up against the wall 26 on both the inside and outside and the freezing operation is started. Excavation of the reservoir 10 is started about 9 weeks after the start of the freezing operation. The exposed frozen wall of the reservoir is insulated as excavation progresses.

After the excavation is completed and the pump suction conduit 23 is installed, the prefabricated roof is lifted into place by two cranes and welded to the member 31 at the top of the wall 26. The discharge pump 22 is positioned in conduit 21, the liquid discharge conduit is connected to the pump 22 outlet and the liquid fill line is connected to the conduit 21. The reservoir is ready for filling with volatile liquid.

An important feature of our invention is that the shell or wall which supports the roof is supported by the freeze pipes that extend deep into the frozen earth. The weight of the roof, including the insulation, is about 20 pounds per square foot. Normal working pressure of the vapor over the reservoir will be about 6 inches of water which is equivalent to an uplift of about 31 pounds per square foot or a net uplift on the roof of about 11 pounds per square foot. Thus, the shell 26 must be able to withstand an uplift of at least about 11 pounds per square foot of roof under operating conditions and must withstand a dead weight of about 20 pounds per square foot when the vapor pressure over the reservoir is atmospheric pressure.

The metal used in the above storage system for low temperature service, e.g., the freeze pipes, roof and ring wall, is weldable steel having superior low temperature impact properties. Steel for such service is commercially available.

The above reservoir is for the storage of liquid propane at substantially atmospheric pressure. Other volatile liquids such as liquefied natural gas; liquefied methane, ethane or butane; liquid ammonia; and the like, can be stored in the above reservoir by choosing the proper refrigerant.

That which is claimed is:

1. The method of supporting an insulated roof over an open-topped reservoir in frozen earth wherein the earth adjacent the reservoir is maintained frozen by means of a plurality of freeze pipes positioned in the earth around said reservoir which comprises positioning a continuous roof-supporting vertical, vapor-impermeable wall around the periphery of said reservoir adjacent said freeze pipes; sealing said wall to the frozen earth; securing said wall to said freeze pipes; and securing said insulated roof to said wall.

2. The method of claim 1 wherein the wall is metal and gussets are welded to the freeze pipes and to the wall.

3. The method of claim 1 wherein the wall is metal, gussets are welded to the freeze pipes, second gussets are welded to the wall and the first and second gussets are bolted together.

4. An earthen storage system for normally gaseous liquid comprising an open-topped earthen reservoir in frozen earth; refrigeration freeze pipe conduit means vertically positioned around the periphery of said reservoir and extending into the earth to a point below the bottom of said reservoir; means to supply refrigeration liquid to said freeze pipes; a continuous, enclosing, vapor-impermeable, roof-supporting shell vertically positioned around said reservoir between said reservoir and said freeze pipes and sealed to frozen earth; a gusset plate secured to each freeze pipe and to said shell; and an insulated roof sealed to and supported by said shell.

5. In an earthen storage system for normally gaseous liquid comprising an earthen reservoir in frozen earth, a plurality of freeze pipes located around the periphery of the reservoir and extending into the earth to maintain the earth adjacent the reservoir frozen, and an insulated roof covering said reservoir, the combination therewith of a continuous, enclosing, roof-supporting vertical, vapor-impermeable wall positioned around the periphery of the reservoir adjacent said freeze pipes and sealed to the frozen earth; means securing said wall to said freeze pipes in load bearing relationship; and said roof sealed to and supported by said wall.

References Cited by the Examiner

UNITED STATES PATENTS

| 2,536,320 | 1/1951 | Smith | 220—18 |
| 2,961,840 | 11/1960 | Goldtrap | 61—0.5 X |
| 3,130,488 | 4/1964 | Lindstrom | 220—18 X |
| 3,159,006 | 12/1964 | Sliepcevich | 61—0.5 X |
| 3,175,370 | 3/1965 | Schlumberger et al. | 61—0.5 X |
| 3,195,310 | 7/1965 | Schroeder | 61—0.5 X |

FOREIGN PATENTS

| 111,569 | 3/1962 | Pakistan. |

EARL J. WITMER, *Primary Examiner.*